United States Patent
Cudak et al.

(10) Patent No.: US 10,855,659 B2
(45) Date of Patent: Dec. 1, 2020

(54) COMMANDING A NEW DEVICE INTO A PROVISIONING STATE

(71) Applicant: LENOVO Enterprise Solutions (Singapore) PTE. LTD., New Tech Park (SG)

(72) Inventors: Gary D. Cudak, Wake Forest, NC (US); Fred A. Bower, Durham, NC (US)

(73) Assignee: LENOVO Enterprise Solutions (Singapore) PTE. LTD, Singapore (SG)

(*) Notice: Subject to any disclaimer, the term of this patent is extended or adjusted under 35 U.S.C. 154(b) by 241 days.

(21) Appl. No.: 15/702,532

(22) Filed: Sep. 12, 2017

(65) Prior Publication Data
US 2019/0081929 A1    Mar. 14, 2019

(51) Int. Cl.
*H04L 12/24* (2006.01)
*H04L 29/06* (2006.01)
*H04L 12/46* (2006.01)
*G06F 21/00* (2013.01)

(52) U.S. Cl.
CPC .......... *H04L 63/0272* (2013.01); *G06F 21/00* (2013.01); *H04L 12/4641* (2013.01); *H04L 41/0806* (2013.01); *H04L 41/0816* (2013.01); *H04L 63/06* (2013.01); *H04L 63/083* (2013.01); *H04L 63/0807* (2013.01)

(58) Field of Classification Search
CPC ............. H04L 12/4641; H04L 12/4679; H04L 63/0807; H04L 41/0806
See application file for complete search history.

(56) References Cited

U.S. PATENT DOCUMENTS

| | | | |
|---|---|---|---|
| 2010/0165876 A1* | 7/2010 | Shukla | H04L 41/0806 370/254 |
| 2012/0222106 A1* | 8/2012 | Kuehl | H04L 63/0209 726/11 |
| 2014/0123135 A1* | 5/2014 | Huang | H04L 41/5054 718/1 |
| 2017/0272404 A1* | 9/2017 | Prey | H04L 63/0272 |

* cited by examiner

*Primary Examiner* — Ellen Tran
(74) *Attorney, Agent, or Firm* — Kunzler Bean & Adamson; Bruce R. Needham

(57) ABSTRACT

An apparatus for securely configuring a tenant VLAN includes a processor and a memory that stores code executable by the processor. The code is executable by the processor to detect connection of a new device to a computing system. The new device is designated for use by a new tenant and the new device in a default state prior to configuration for use by the new tenant. The computing system is a multi-tenant system. The code is executable by the processor to command the new device to enter a provisioning state in response to detecting connection of the new device. The new device in the provisioning state is unable to access operational equipment of the computing system and data stored by tenants of the computing system.

20 Claims, 7 Drawing Sheets

COMMANDING A NEW DEVICE INTO A PROVISIONING STATE

FIELD

The subject matter disclosed herein relates to multi-tenant computing systems and more particularly relates to providing a secure way to provision devices for a new tenant in a multi-tenant computing system.

BACKGROUND

Multi-tenant computing systems, which may be embodied by cloud computing systems, are vulnerable to attack by a hacker connecting to a virtual local area network ("VLAN") of the computing system and then accessing data, reconfiguring devices, such as servers, and other malicious actions.

BRIEF SUMMARY

An apparatus for securely configuring a tenant VLAN is disclosed. A method also performs the functions of the apparatus. An alternate apparatus for assigning a token for secure use of a VLAN is also disclosed. The apparatus for securing configuring a tenant VLAN includes a processor and a memory that stores code executable by the processor. The code is executable by the processor to detect connection of a new device to a computing system. The new device is designated for use by a new tenant and the new device in a default state prior to configuration for use by the new tenant. The computing system is a multi-tenant system. The code is executable by the processor to command the new device to enter a provisioning state in response to detecting connection of the new device. The new device in the provisioning state is unable to access operational equipment of the computing system and data stored by tenants of the computing system.

The apparatus for assigning a token for secure use of a VLAN includes a processor and a memory that stores code executable by the processor. The code is executable to command one or more devices connected to a computing system to enter a provisioning state. The computing system is a multi-tenant system. The one or more devices in the provisioning state are unable to access operational equipment of the computing system and data stored by tenants of the computing system. The code is executable to configure the one or more devices as part of a tenant VLAN accessible by a new tenant during a provisioning process in response to receiving tenant configuration information, and to assign a token to the new tenant, wherein the token enables access to the one or more devices within the tenant VLAN of the new tenant.

The method includes detecting connection of a new device to a computing system. The new device is designated for use by a new tenant and the new device in a default state prior to configuration for use by the new tenant. The computing system is a multi-tenant system. The method includes commanding the new device to enter a provisioning state in response to detecting connection of the new device. The new device in the provisioning state is unable to access operational equipment of the computing system and data stored by tenants of the computing system.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
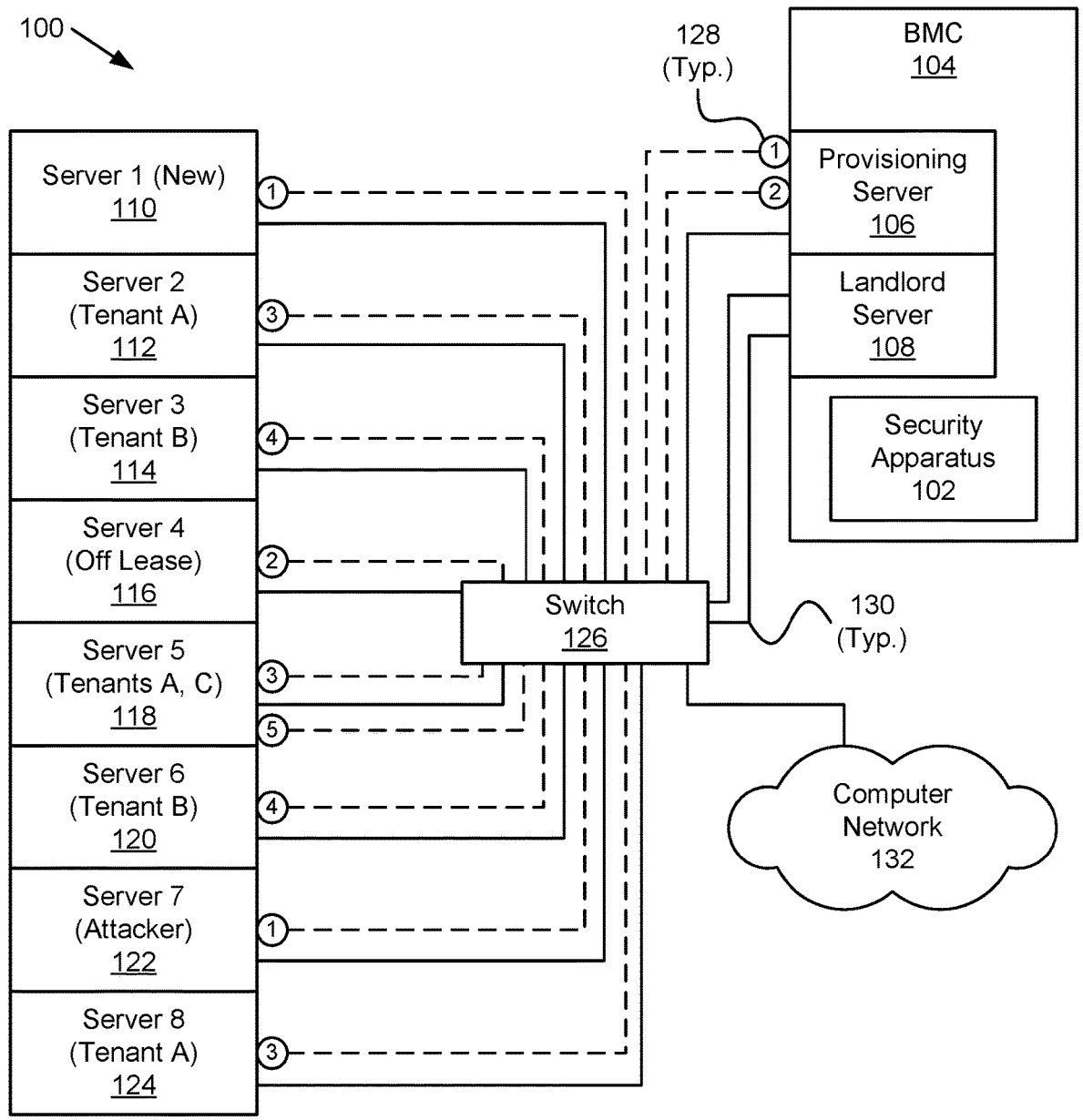
FIG. 1 is a schematic block diagram illustrating one embodiment of a computing system for securely configuring a tenant virtual local area network ("VLAN")

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for securely configuring a tenant VLAN is disclosed. A method also performs the functions of the apparatus. An alternate apparatus for assigning a token for secure use of a VLAN is also disclosed. The apparatus for securing configuring a tenant VLAN includes a processor and a memory that stores code executable by the processor. The code is executable by the processor to detect connection of a new device to a computing system. The new device is designated for use by a new tenant and the new device in a default state prior to configuration for use by the new tenant. The computing system is a multi-tenant system. The code is executable by the processor to command the new device to enter a provisioning state in response to detecting connection of the new device. The new device in the provisioning state is unable to access operational equipment of the computing system and data stored by tenants of the computing system.

In one embodiment, the code is further executable by the processor to configure the new device as part of a tenant VLAN accessible by the new tenant during a provisioning process in response to receiving tenant configuration information. In another embodiment, the code is further executable by the processor to assign a token to the new tenant, where the token enables access to devices within a tenant VLAN of the new tenant. In another embodiment, the code is further executable by the processor to enable an additional tenant VLAN in response to a command by the new tenant. The additional VLAN is configured through the provisioning VLAN during the provisioning process and the token allows the new tenant access to the additional tenant VLAN. In another embodiment, the token is configured to be accessible by a landlord server to grant and revoke access by the new tenant to the tenant VLAN and/or the additional tenant VLAN.

In a further embodiment, the code is further executable by the processor to place an existing device in a repurposing VLAN, where the existing device is connected to the computing system and was previously used by a tenant, to reset the existing device to a default state, where devices of tenants of the computing system are inaccessible to the existing device after the existing device is reset, to move the existing device to the provisioning VLAN, and to configure the existing device as part of the tenant VLAN accessible by the new tenant in response to receiving tenant configuration information. In another embodiment, the computing system includes a plurality of tenants, where each tenant accesses one or more VLANs. Each VLAN accessible by a tenant is inaccessible by other tenants.

In one embodiment, the new device is accessible by the new tenant through the tenant VLAN of the new tenant in response to configuration through the provisioning server and in response to exiting the provisioning state. In another embodiment, the new device is a computing device with a processor, a processing core, a server, a mainframe computer, a switch, a router, a data storage device, or a networking device. In another embodiment, the tenant VLAN is accessible through a global network address and computing resources accessible through the tenant VLAN are configured using local network addresses.

The apparatus for assigning a token for secure use of a VLAN includes a processor and a memory that stores code executable by the processor. The code is executable to command one or more devices connected to a computing system to enter a provisioning state. The computing system is a multi-tenant system. The one or more devices in the provisioning state are unable to access operational equipment of the computing system and data stored by tenants of the computing system. The code is executable to configure the one or more devices as part of a tenant VLAN accessible by a new tenant during a provisioning process in response to receiving tenant configuration information, and to assign a token to the new tenant, wherein the token enables access to the one or more devices within the tenant VLAN of the new tenant.

In one embodiment, the code is further executable by the processor to detect connection of a new device to the computing system, where the new device is designated for use by the new tenant and the new device in a default state prior to configuration for use by the new tenant, and to command the new device to enter a provisioning state in response to detecting connection of the new device, where the new device is a device of the one or more devices. In another embodiment, the code is further executable by the processor to place an existing device in a repurposing VLAN, where the existing device is connected to the computing system and was previously used by a tenant, to reset the existing device to a default state, where devices of tenants of the computing system are inaccessible to the existing device after the existing device is reset, to move the existing device to the provisioning VLAN, and to configure the existing device as part of the tenant VLAN accessible by the new tenant in response to receiving tenant configuration information. The existing device is a device of the one or more devices. In another embodiment, the token is configured to be accessible by a landlord server to grant and revoke access by the new tenant to the one or more devices of the tenant VLAN.

The method includes detecting connection of a new device to a computing system. The new device is designated for use by a new tenant and the new device in a default state prior to configuration for use by the new tenant. The computing system is a multi-tenant system. The method includes commanding the new device to enter a provisioning state in response to detecting connection of the new device. The new device in the provisioning state is unable to access operational equipment of the computing system and data stored by tenants of the computing system.

In one embodiment, the method includes configuring the new device as part of a tenant VLAN accessible by the new tenant during a provisioning process in response to receiving configuration through a provisioning VLAN. In another embodiment, the method includes assigning a token to the new tenant, where the token enables access to devices within a tenant VLAN of the new tenant. In another embodiment, the method includes enabling an additional tenant VLAN in response to a command by the new tenant, where the additional VLAN is configured through the provisioning VLAN during the provisioning process and the token allows the new tenant access to the additional tenant VLAN.

In another embodiment, the token is configured to be accessible by a landlord server to grant and revoke access by the new tenant to the tenant VLAN and/or the additional tenant VLAN. In another embodiment, the method includes placing an existing device in a repurposing VLAN, where the existing device is connected to the computing system and was previously used by a tenant, resetting the existing device to a default state, where devices of tenants of the computing system are inaccessible to the existing device after the existing device is reset, moving the existing device to the provisioning VLAN, and configuring the existing device as part of the tenant VLAN accessible by the new tenant in response to receiving tenant configuration information.

Figure 2:
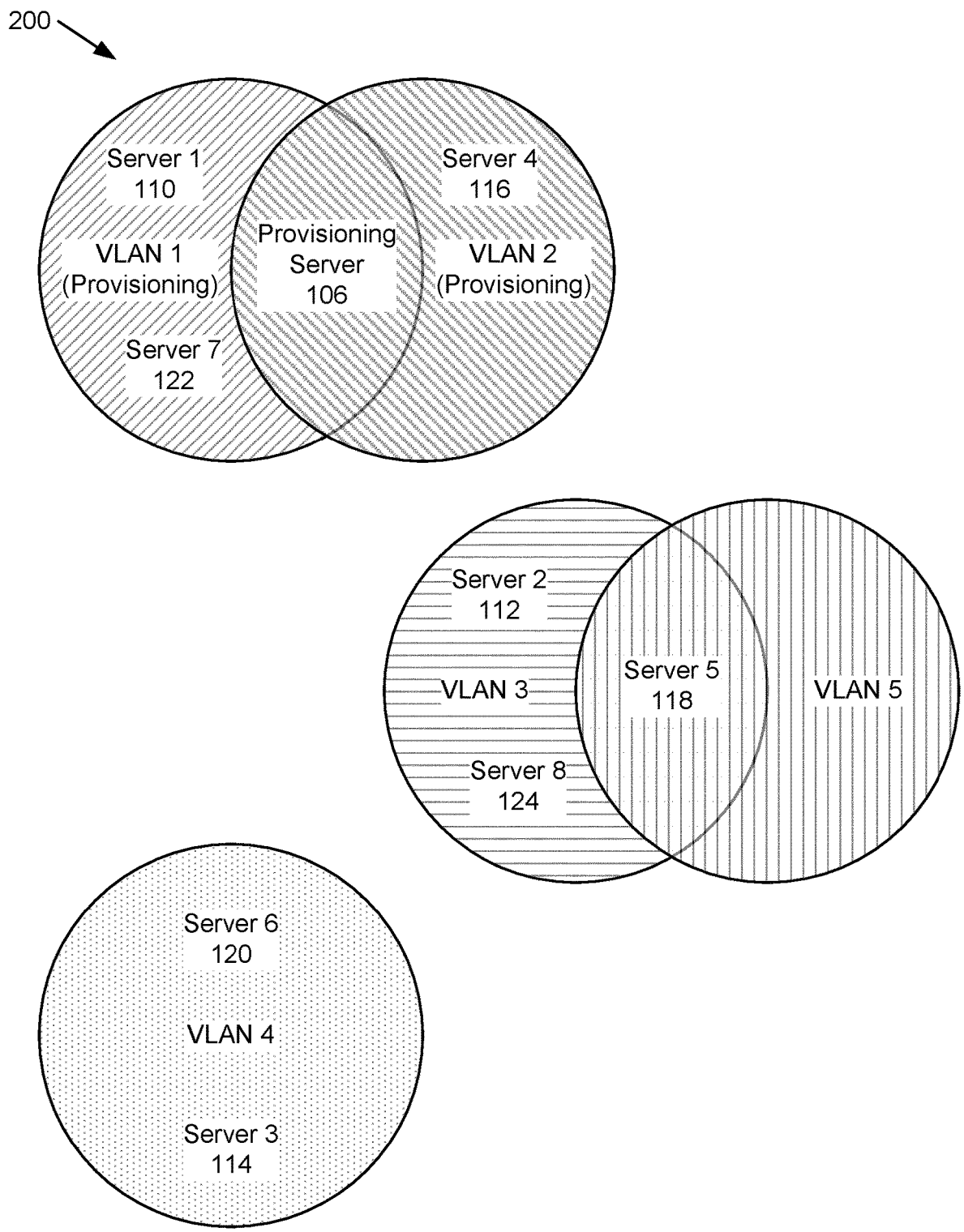
FIG. 2 is a schematic block diagram illustrating one embodiment of a Venn diagram illustrating servers and VLANs of the computing system of FIG. 1.

FIG. 1 is a schematic block diagram illustrating one embodiment of a computing system 100 for securely configuring a tenant VLAN. FIG. 2 is a schematic block diagram illustrating one embodiment of a Venn diagram illustrating servers and VLANs of the computing system 100 of FIG. 1. The system 100 includes a security apparatus 102 in a baseboard management controller 104 with a provisioning server 106 and a landlord server 108, a first server 110, a second server 112, a third server 114, a fourth server 116, a fifth server 118, a sixth server 120, a seventh server 122, an eighth server 124, a switch 126, a typical VLAN connection 128, a typical physical network link 130, and a computer network 132, which are described below.

The system 100 includes a security apparatus 102 in a baseboard management controller ("BMC") 104 that controls a computing system 100. The computing system 100 is a multi-tenant system where computing resources are divided and assigned to tenants. Each tenant is able to access computing resources assigned to the tenant through a tenant VLAN assigned to the tenant. In one embodiment, the security apparatus 102 provides a secure environment for provisioning a tenant VLAN for a new tenant by detecting new devices and placing the new devices into a provisioning state in a provisioning VLAN where the new devices are incapable of reaching VLANs, devices, data, etc. of other tenants of the computing system 100. The new devices are then configured for use by the new tenant and a tenant VLAN is created for the new tenant. The new device is a computing device with a processor, a processing core, a server, a mainframe computer, a switch, a router, a data storage device, a networking device, and the like.

In one embodiment, the security apparatus 102 assigns a token to the new tenant where the token provides the new tenant with access to the tenant VLAN and resources configured for the new tenant. The use of tokens by tenants prevents a tenant from accessing resources of another tenant. The token allows an administrator to revoke access to a tenant VLAN and associated resources, for example when a lease for the tenant expires.

The security apparatus 102, in some embodiments, allow an existing device of the computing system 100 to be re-provisioned by placing the existing device in a re-provisioning VLAN, resetting the existing device and then placing the existing device in the provisioning VLAN to be configured for a new tenant in a tenant VLAN. The security apparatus 102 is discussed in further detail with regard to the apparatuses 300, 400, 500 of FIGS. 3-5.

The computing system 100, in one embodiment, is a cloud computing system that enables on-demand network access to a shared pool of configurable computing resources, such as networks, network bandwidth, servers, processors, memory, data storage, virtual machines, applications, and other services that can be conveniently provisioned for a tenant and then released after use. The cloud computing system, in one embodiment, provides a tenant an ability to unilaterally provision computing resources, such as server time, network storage, etc. as needed without human interaction with the cloud computing system's provider. In another embodiment, the cloud computing system provides capabilities available over a network and accessed through standard interfaces that are available by heterogeneous thin or thick client platforms (e.g. smartphones, tablets, laptops, etc.).

In another embodiment, the cloud computing system provides pooled resources to serve multiple tenants using a multi-tenant model with different physical and virtual resources dynamically assigned to reassigned based on demand. Typically, the tenant has no knowledge of the physical location of the resources of the cloud computing system but may be able to specify location at a high level, e.g. region, state, country, etc. In another embodiment, the cloud computing system may be quickly scaled to meet the needs of a tenant. In another embodiment, the cloud computing system provides software as a service ("SaaS"), platform as a service ("PaaS") and/or infrastructure as a service ("IaaS") capabilities.

The cloud computing system may be a single cloud computing system or may be a combination or two or more cloud computing systems. In one embodiment, the cloud computing system is a private cloud available to a particular organization. In another embodiment, the cloud computing system is a public cloud generally public or available to a large industry group or owned by an entity that sells cloud services. In another embodiment, the cloud computing system may be hybrid system that includes two or more clouds (private or public) that remain unique entities but are bound together by standardized or proprietary technology that allow data and application proportionality The BMC 104, in one embodiment, controls the provisioning server 106, the landlord server 108, and other servers (e.g. 110-124) of the computing system 100. In other embodiments, the computing system 100 includes one or more other computing devices to control the computing system 100. The BMC 104, in one embodiment, includes a specialized service processor that monitors the physical state of computers of the computing system 100, a network server or other hardware device, for example, by using sensors and communicating with a system administrator through an independent connection. In another embodiment, the BMC 104 includes multiple computers, such as the provisioning server 106 and the landlord server 108 and may include other computers, cores, etc. forming a controller that manages the computing system 100.

In one embodiment, the security apparatus 102 is part of the BMC 104. In other embodiments, one or more components, modules, functions, etc. of the security apparatus 102 are distributed in one or more devices of the computing system 100. For example, the switch 126 may include functionality of the security apparatus 102 to detect a new device being connected to the computing system 100.

The computing system 100, in one embodiment, includes a provisioning server 106 in the BMC 104. The provisioning server 106, in other embodiments, is located elsewhere in the computing system 100. The provisioning server 106, in one embodiment, provides a mechanism to configure new devices and existing devices for use by a new tenant in a tenant VLAN. The provisioning server 106 may also be used to configure the tenant VLAN. In one embodiment, tenant configuration information is input, controlled, etc. by a system administrator. In another embodiment, configuration is automated and is based on information from the new tenant under certain boundaries, limitations, etc. A system administrator, in one example, may override configuration settings. In another embodiment, the security apparatus 102 uses the provisioning server 106 to assigns a token to the new client for the tenant VLAN and resources in the tenant VLAN. The security apparatus 102 may also use the provisioning server 106 to activate the tenant VLAN and/or the token assigned to the tenant. One of skill in the art will recognize other functions of the provisioning server 106.

The computing system 100 includes, in one embodiment, a landlord server 108. The landlord server 108 may be used, in some embodiments, to control, configure, monitor, etc. physical elements of the computing system 100. For example, the landlord server 108 may control the switch 126, communication between the switch 126 and computer network 132, communication over physical cabling between the switch 126 and servers 110-124, etc. For example, a virtualization layer may exist on top of a physical equipment layer and may control data traffic, storage devices, etc. according to various tenant VLANs while the landlord server 108 manages data flow and equipment based on the virtualization. In one instance, tenant VLAN 3 may include use of Server 2 112 and a portion of Server 5 118 for Tenant A where Tenant A may see a single server.

The computing system 100 includes several servers 110-124. In one embodiment, the servers 110 are virtual servers with memory, storage, etc. where actual computers, cores, storage devices, switches, etc. (not shown) are configured to appear as one or more virtual servers. In one embodiment, the virtual servers of a tenant VLAN are configured to meet the demands of a tenant. The tenant may require a particular computing speed, a particular number of cores, an amount of memory, an amount of data storage, etc. and the virtual server and corresponding VLAN are chosen to meet the tenant's requirements. The tenant is limited by physical resources, such as a maximum amount of allocatable memory, processor speed, storage size, etc. In another embodiment, physical resources are throttled down to meet tenant requirements while preserving computing capacity for other tenants that require more resources, such as higher computing speed, etc.

In the depicted embodiment, Server 1 110 is new, meaning that media access control ("MAC") address or other identifier of Server 1 110 was not found when Server 1 110 was connected to the computing system 100. In a traditional computing system, placing a new, unconfigured device onto the computing system makes the system vulnerable because an attacker, such as Server 7 122 may gain access to the computing system, appearing as a connected device, and may configure the new device to access other tenant VLANs or other tenant resources. In the embodiments described herein, Server 1 110 and Server 7 122, which also appears as a new device, are immediately placed in a provisioning VLAN 1 where the provisioning server 106 may ignore or remove access to Server 7 122 and may configure Server 1 110 for a new tenant. While on the provisioning VLAN 1, the server of the attacker, Server 7 122, does not have access to other VLANs or other computer resources because the provisioning VLAN 1 is set up to be isolated from other tenant VLANs (e.g. 2, 3, 4, 5).

In the embodiment depicted in FIG. 1, Server 2 112, Server 8 124 and a portion of Server 5 118 are provisioned for Tenant A in VLAN 3. Also, Server 3 114 and Server 6 120 are provisioned for Tenant B on VLAN 4, and a portion of Server 5 118 is provisioned for Tenant C on VLAN 5. Server 4 116 is off lease, meaning that Server 4 116 is available for provisioning for a new tenant.

Note that each server 110-124 as well as the provisioning server 106 and landlord server 108 are depicted as connected to the switch 126 over a physical network link and a VLAN connection. In the physical layer, all of the servers 106-124 are connected physically to the switch and the physical connections may be identical and undiscernible from each other. The virtual layer may include controls that isolate tenants based on the tenant VLANs. For example, VLAN 3 and VLAN 5 may use a single physical connection from Server 5 118 to the switch 126 but network traffic may be segregated in the virtualization layer so data addressed to Tenant A goes to Tenant A and data addressed to Tenant C goes to Tenant C.

The computing system 100 includes a switch 126 that routes data from the computer network 132 to the appropriate VLAN and vice versa. For example, each VLAN may be assigned a global network address and the computing system 100 may include a network address translation ("NAT") gateway device that determines which VLAN to send a received data packet based on a global network address of the data packet. The NAT gateway device may be part of the switch 126 or may be located elsewhere, such as in the BMC 104. The NAT gateway device may add an appropriate global network address to a data packet from a particular VLAN (e.g. 3) to identify the source of the data packet.

In one embodiment, having a NAT gateway device in the computing system 100 allows the computing system 100 to use local addressing of various devices within the computing system 100. For example, the computing system 100 may utilize the IPv4 address pool for each VLAN, which may be advantageous due to less bits in a local network address than other address protocols.

While the switch 126 is depicted as a single switch, the switch 126 may include multiple switches, routers, servers, cabling, etc. operating together within the computing system 100. The switch 126 may appear as a single location or multiple locations and may be controlled with the BMC 104 or other devices.

As mentioned above, the computing system 100 may include other devices not depicted, such as processors, cores, switches, routers, storage devices, storage area networks, storage controllers, power supplies and other equipment common to a computing system and/or a cloud computing system. FIG. 1 is simplified for convenience and one of skill in the art will recognize that the computing system includes other equipment not depicted in FIG. 1.

FIG. 1 also depicts a computer network 132 that is connected to the computing system 100 through the switch 126. The computer network 132, in one embodiment, includes connection to other computing systems and may include the Internet, a local area network ("LAN"), a wide area network ("WAN"), a wireless network and the like and may include a combination of networks. For example, the computer network 132 may include a LAN connected between the switch 126 and an internet service provider ("ISP").

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application. One of skill in the art will recognize other forms of a computer network 132 allowing access between the computing system 100 of FIG. 1 and other computing systems and equipment.

FIG. 2 is a schematic block diagram illustrating one embodiment of a Venn diagram illustrating servers and VLANs of the computing system 100 of FIG. 1. In the first Venn diagram at the top, there are two VLANs displayed; VLAN 1 and VLAN 2, which are both provisioning VLANs. Both VLAN 1 and VLAN 2 include the provisioning server 106. Server 1 110 is to be provisioned for a new client and is included in VLAN 1. Note that Server 7 122, which is the server of an attacker, is immediately placed in provisioning VLAN 1 and is thus blocked from accessing other tenant servers and Server 1 110 is configured before being released from the provisioning VLAN 1 so that even if the attacker Server 7 122 is able to do something to Server 1 110, Server 1 110 will be reconfigured per the tenant's instruction before being released to the tenant.

Server 4 116 is not being used and is placed in provisioning VLAN 2 while not being used. In one embodiment, VLAN 2 is a repurposing VLAN and resets Server 4 116 before Server 4 116 is placed in provisioning VLAN 1. In another embodiment, Server 4 116 has already been reset before being placed in provisioning VLAN 2.

Servers 2 112, Server 8 124 and a portion of Server 5 118 are placed in VLAN 3, which is used by Tenant A. Another portion of Server 5 118 is placed in VLAN 5 and is used by Tenant C. VLAN 4 includes Server 6 120 and Server 3 114, which are used by Tenant C. The Venn diagram is illustrative of one particular embodiment and is not intended to be limiting but instead points out various scenarios that may be used for the embodiments described herein.

Figure 3:
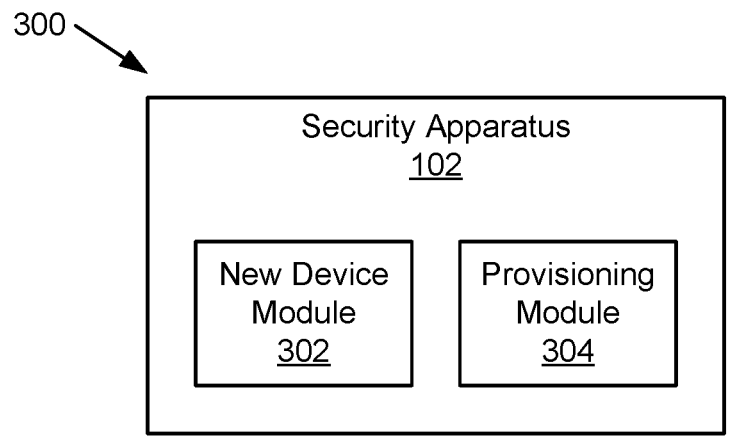
FIG. 3 is a schematic block diagram illustrating one embodiment of an apparatus for securely configuring a tenant VLAN.

FIG. 3 is a schematic block diagram illustrating one embodiment of an apparatus 300 for securely configuring a tenant VLAN. The apparatus 300 includes one embodiment of the security apparatus 102 with a new device module 302 and a provisioning module 304, which are described below.

The apparatus 300 includes a new device module 302 that detects connection of a new device to a computing system 100. The new device is in a default state prior to configuration for use by the new tenant. As described above, the computing system 100 is a multi-tenant system. In one embodiment, the new device module 302 works in conjunction with the NAT gateway device and determines that the connected new device does not have a MAC address and/or other identifier that is included in a registry of the NAT gateway device. The registry includes the MAC address and/or other identifier of each device connected or previously connected to the computing system 100.

In one embodiment, the new device module 302 works with the NAT gateway device to read the MAC address and/or other identifier to place the MAC address and/or other identifier of the new device into the registry of the NAT gateway device.

In one embodiment, the new device is designated for use by a new tenant. For example, the new tenant may have requirements that are not currently met by current resources of the computing system 100 so a new device, such as Server 1 110 is added to meet the needs of the new tenant. In another embodiment, when a device such as a server is removed from service, for example at the end of a lease of a tenant, the device is disconnected from the computing system 100 and the NAT gateway device removes the MAC address and/or other identifier of the device from the registry so that the device appears as a new device when reconnected to the computing system 100. In the embodiment, the existing device appears as a new device when connected to meet the demands of the new tenant.

In one embodiment, connection of the new device is a physical connection, for example when a system administrator physically plugs in a cable to connect the new device. In another embodiment, connection of the new device includes closing a switch, making a wireless connection, or other connection type that does not require a person to physically connect the new device.

The default state of the new device includes a state where the new device is not configured for a particular VLAN used by a tenant. The default state, in some embodiments, includes the new device being in a reset condition, in a state as shipped from a factory, or other condition that requires configuration to be useful to the new tenant. In another embodiment, the default condition is a state where the new device is incapable of connecting to resources, data, etc. of the computing system 100 other than connection to the provisioning server 106 so that the new device is isolated within a provisioning VLAN (e.g. VLAN 1).

The apparatus 300 includes a provisioning module 304 that commands the new device to enter a provisioning state in response to detecting connection of the new device. The provisioning module 304, in one embodiment, forces new devices into the provisioning VLAN immediately upon connection and determination by the new device module 302 that the connected device is a new device before the new device has a chance to do harm to the computing system 100. The provisioning module 304 thus helps protect the computing system 100 from attackers by isolating new devices. In the provisioning state, the new device is unable to access operational equipment of the computing system 100 and data stored by tenants of the computing system 100. The computing system 100 includes a plurality of tenants and each tenant accesses one or more VLANs. Each VLAN is accessible by a tenant is inaccessible by other tenants.

Figure 4:
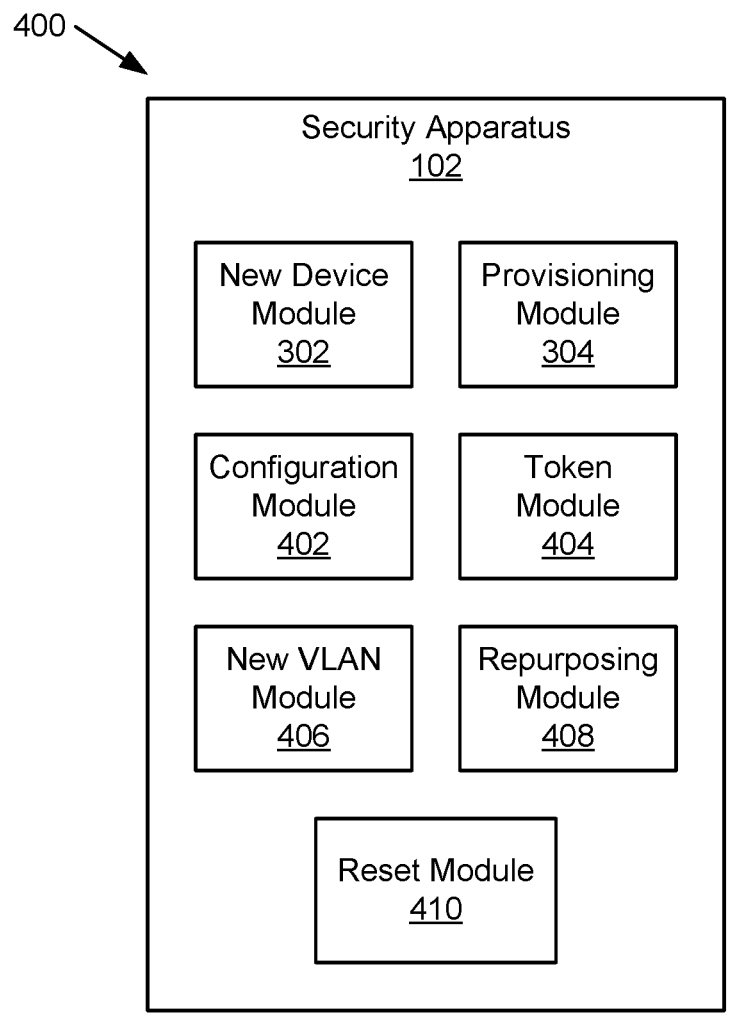
FIG. 4 is a schematic block diagram illustrating another embodiment of an apparatus for securely configuring a tenant VLAN.

FIG. 4 is a schematic block diagram illustrating another embodiment of an apparatus 400 for securely configuring a tenant VLAN. The apparatus 400 includes another embodiment of the security apparatus 102 with a new device module 302 and a provisioning module 304 that are substantially similar to those described above in relation to the apparatus 300 of FIG. 3. The security apparatus 102, in various embodiments, includes a configuration module 402, a token module 404, a new VLAN module 406, a repurposing module 408 and/or a reset module 410, which are described below.

In one embodiment, the apparatus 400 includes a configuration module 402 that configures the new device as part of a tenant VLAN (e.g. a new VLAN 6) accessible by the new tenant during a provisioning process in response to receiving tenant configuration information, for example, from the provisioning server 106 of the computing system 100 through a provisioning VLAN (e.g. VLAN 1). For example, the tenant may enter system requirements and the configuration module 402 may interpret the requirements to create tenant configuration information that the configuration module 402 uses to configure the new device.

In another embodiment, a system administrator inputs tenant configuration information that the configuration module 402 uses to configure the new device. In another embodiment, the computing system 100 includes, BMC 104 or other device inputs information for the configuration module 402 to use to configure the new device. For example, the BMC 104 may determine a VLAN number, a global network address, or other tenant configuration information that the configuration module 402 may use to configure the new device. In another embodiment, the new device is accessible by the new tenant through the tenant VLAN of the new tenant in response to configuration through the provisioning server 106 and in response to exiting the provisioning state. One of skill in the art will recognize other tenant configuration information, sources of the information, formatting of the tenant configuration information, etc. for the configuration module 402 to configure the new device.

The apparatus 400, in some embodiments, includes a token module 404 that assigns a token to the new tenant where the token enables access to devices within a tenant VLAN of the new tenant. For example, tokenization provides a level of data security as well as limitations on devices and resources to be accessed. In one embodiment, tokenization is a process of substituting a sensitive data element with a non-sensitive equivalent, referred to as a token, that has no extrinsic or exploitable meaning or value. The token is a reference (e.g. an identifier) that maps back to the sensitive data through a tokenization system. The mapping from original data to a token uses methods which render tokens infeasible to reverse in the absence of the tokenization system. In one example, tokens are created from random numbers. In one embodiment, the tokenization system is secured and validated using security methods applicable to sensitive data protection, secure storage, audit, authentication, authorization, etc. The tokenization system, in some embodiments, a system administrator, the BMC 104, etc. with authority and interfaces to request tokens, detokenize back to sensitive data and/or to revoke permission to access the tenant's VLAN and/or allocated resources.

The apparatus 400, in some embodiments, includes a new VLAN module 406 that enables an additional tenant VLAN in response to a command by the new tenant, where the additional VLAN is configured through the provisioning VLAN during the provisioning process and the token allows the new tenant access to the additional tenant VLAN. For example, the additional VLAN may be inactive when created and the new tenant may have a desire for an additional VLAN and the new VLAN module 406 responds to a command from the new tenant and activates the additional VLAN. In another embodiment, the new VLAN module 406 creates an additional VLAN based on limitations placed on the VLAN by the BMC 104, the system administrator, etc. For example, the additional VLAN may be activated using the token assigned to the new tenant that limits access of additional VLAN to certain resources of the computing system 100.

The apparatus 400, in some embodiments, includes a repurposing module 408 that places an existing device in a repurposing VLAN. The existing device is connected to the computing system 100 and was previously used by a tenant. For example, the repurposing module 408 may place Server 4 116, which is off lease, in VLAN 2, which may be a repurposing VLAN. In the repurposing VLAN, the existing device, in some embodiments, is isolated from other tenant VLANs and from a provisioning VLAN, such as provisioning VLAN 1. The apparatus 400, in the embodiment, includes a reset module 410 that resets the existing device to a default state, where devices of tenants of the computing system are inaccessible to the existing device after the existing device is reset.

In one embodiment, the reset module 410 works in conjunction with the NAT gateway device to remove the MAC address and/or identifier of the existing device from the registry of the NAT gateway device so that the provisioning module 304 moves the existing device to a provisioning VLAN, such as VLAN 1. In another embodiment, the MAC address and/or other identifier in the registry remains in the registry and the reset module 410 or provisioning module 304 moves the existing device to the provisioning VLAN. In the embodiment, the configuration module 402 configures the existing device as part of a tenant VLAN accessible by a new tenant in response to receiving tenant configuration information, for example, from the provisioning server 106. For example, the configuration module 402 configures the existing device while the existing device is in a provisioning state and in the provisioning VLAN.

Figure 5:
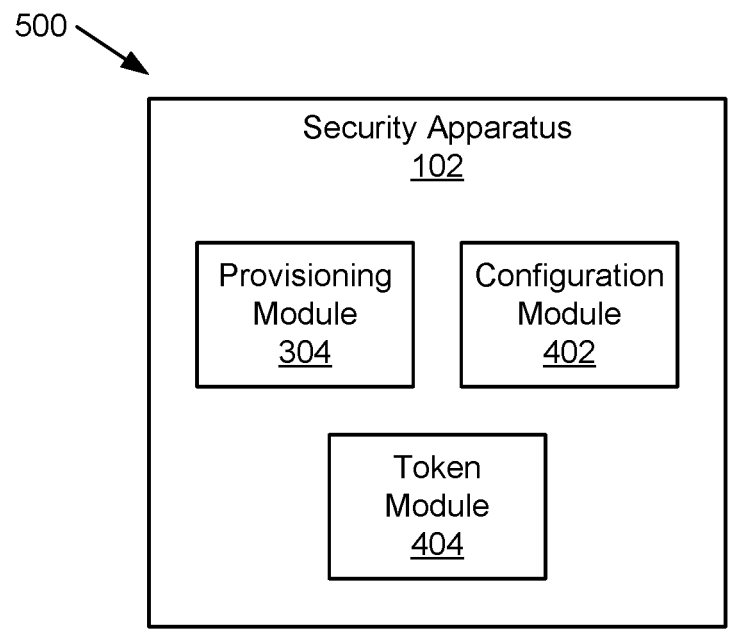
FIG. 5 is a schematic flow chart diagram illustrating one embodiment of an apparatus for assigning a token to a tenant VLAN.

FIG. 5 is a schematic flow chart diagram illustrating one embodiment of an apparatus 500 for assigning a token to a tenant VLAN. The apparatus 500 includes another embodiment of the security apparatus 102 with a provisioning module 304, a configuration module 402 and a token module 404, which are described above and are further described below.

The apparatus 500 includes a provisioning module 304 that commands one or more devices connected to a computing system 100 to enter a provisioning state. The computing system 100 is a multi-tenant system. The one or more devices in the provisioning state are unable to access operational equipment of the computing system and data stored by tenants of the computing system. In the embodiment, the one or more devices may be new devices or existing devices.

The apparatus 500 includes a configuration module 402 that configures the one or more devices as part of a tenant VLAN accessible by a new tenant during a provisioning process in response to receiving tenant configuration information from a provisioning server 105 of the computing system 100 through a provisioning VLAN, such as VLAN 1. The apparatus 500 includes a token module that assigns a token to the new tenant, where the token enables access to the one or more devices within the tenant VLAN of the new tenant.

In a further embodiment, the provisioning module 304 may also detect connection of a new device to the computing system 100, where the new device designated for use by the new tenant, and the new device in a default state prior to configuration for use by the new tenant, and the provisioning module 304 commands the new device to enter a provisioning state in response to detecting connection of the new device, where the new device is a device of the one or more devices. In an additional embodiment, the repurposing module 408 places an existing device in a repurposing VLAN, where the existing device was connected to the computing system 100 and previously used by a tenant, and the reset module 410 resets the existing device to a default state, where devices of tenants of the computing system are inaccessible to the existing device after the existing device is reset.

In the embodiment, the provisioning module 304 moves the existing device to the provisioning VLAN and the configuration module 402 configures the existing device as part of the tenant VLAN accessible by the new tenant in response to receiving tenant configuration information from a provisioning server 106, where the existing device is a device of the one or more devices. In another embodiment, the token is configured to be accessible by a landlord server 108 to grant and revoke access by the new tenant to the one or more devices of the tenant VLAN.

Figure 6:
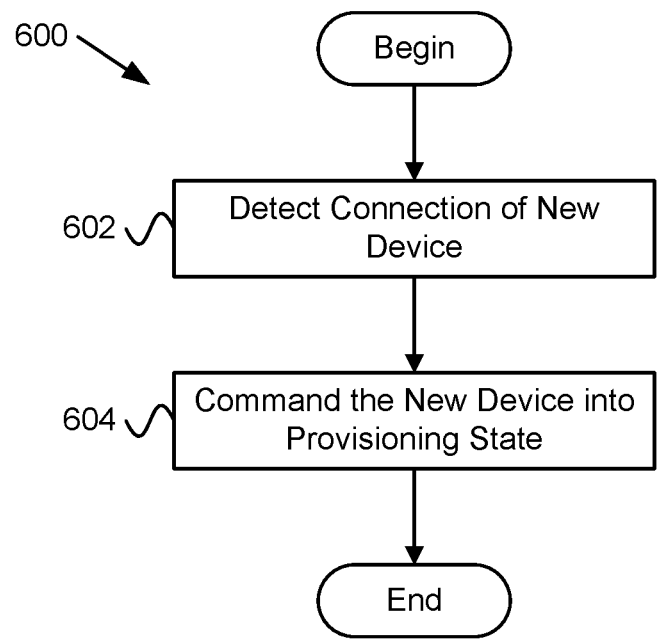
FIG. 6 is a schematic flow chart diagram illustrating one embodiment of a method for securely configuring a tenant VLAN.

FIG. 6 is a schematic flow chart diagram illustrating one embodiment of a method 600 for securely configuring a tenant VLAN. The method 600 begins and detects 602 connection of a new device to a computing system 100. The new device is designated for use by a new tenant and the new device in a default state prior to configuration for use by the new tenant. The computing system 100 is a multi-tenant system. The method 600 commands 604 the new device to enter a provisioning state in response to detecting connection of the new device, and the method 600 ends. The new device in the provisioning state is unable to access operational equipment of the computing system 100 and data stored by tenants of the computing system 100. The method 600 may be implemented by one or more of the new device module 302 and the provisioning module 304.

Figure 7:
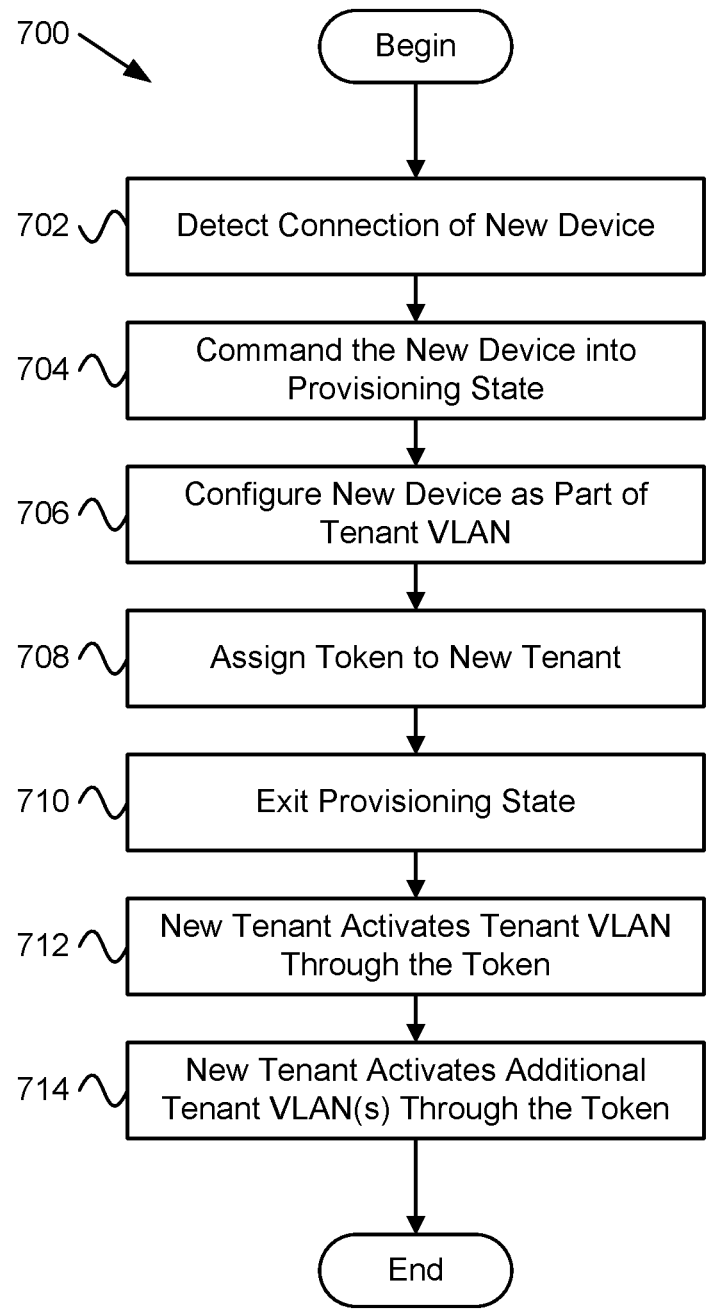
FIG. 7 is a schematic flow chart diagram illustrating another embodiment of a method for securely configuring a tenant VLAN.

FIG. 7 is a schematic flow chart diagram illustrating another embodiment of a method 700 for securely configuring a tenant VLAN. The method 700 begins and detects 702 connection of a new device to a computing system 100. The new device is designated for use by a new tenant and the new device in a default state prior to configuration for use by the new tenant. The computing system 100 is a multi-tenant system. The method 700 commands 704 the new device to enter a provisioning state in response to detecting connection of the new device. The new device in the provisioning state is unable to access operational equipment of the computing system 100 and data stored by tenants of the computing system 100. The method 700 configures 706 the new device as part of a tenant VLAN accessible by the new tenant during a provisioning process in response to receiving tenant configuration information. For example, the tenant configuration information may be received from a provisioning server 106 of the computing system through a provisioning VLAN.

The method 700 assigns 708 a token to the new tenant, where the token enables access to devices within a tenant VLAN of the new tenant. The method 700 exits 710 the provisioning state and the method 700 allows the new tenant to activate 712 the tenant VLAN through the token. The method 700 allows the new tenant to activate 714 one or more additional tenant VLANs through the token and the method 700 ends. The method 700, in various embodiments, may be implemented using the new device module 302, the provisioning module 304, the configuration module 402, the token module 404, and the new VLAN module 406.

Figure 8:
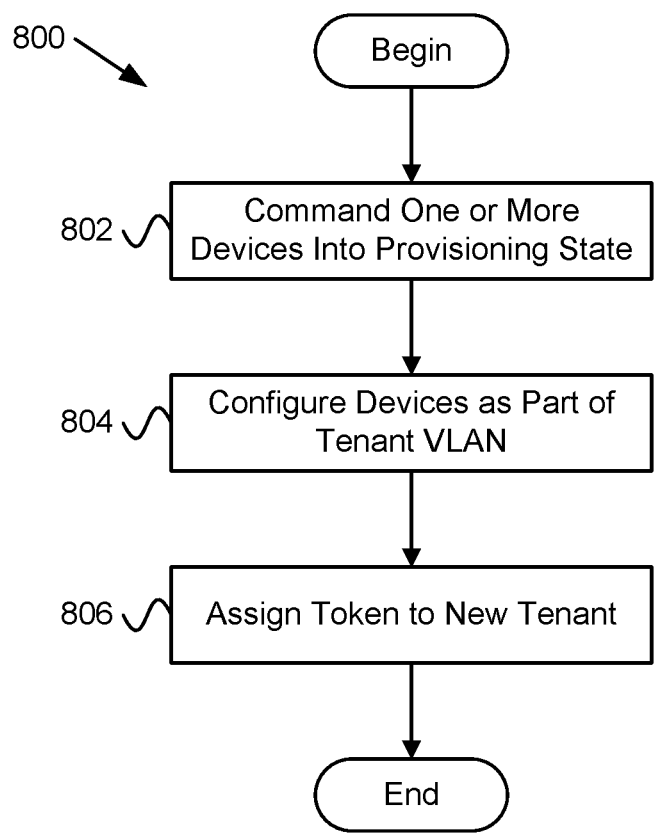
FIG. 8 is a schematic flow chart diagram illustrating another embodiment of a method for assigning a token to a tenant VLAN.

FIG. 8 is a schematic flow chart diagram illustrating another embodiment of a method 800 for assigning a token to a tenant VLAN. The method 800 begins and commands 802 one or more devices connected to a computing system 100 to enter a provisioning state. The computing system 100 is a multi-tenant system. The one or more devices in the provisioning state are unable to access operational equipment of the computing system 100 and data stored by tenants of the computing system 100.

The method 800 configures 804 the one or more devices as part of a tenant VLAN accessible by a new tenant during a provisioning process in response to receiving tenant configuration information. The method 800 assigns 806 a token to the new tenant, where the token enables access to the one or more devices within the tenant VLAN of the new tenant, and the method 800 ends. The method 800 may be implemented, in one embodiment, using the provisioning module 304, the configuration module 402 and/or the token module 404.

Figure 9:
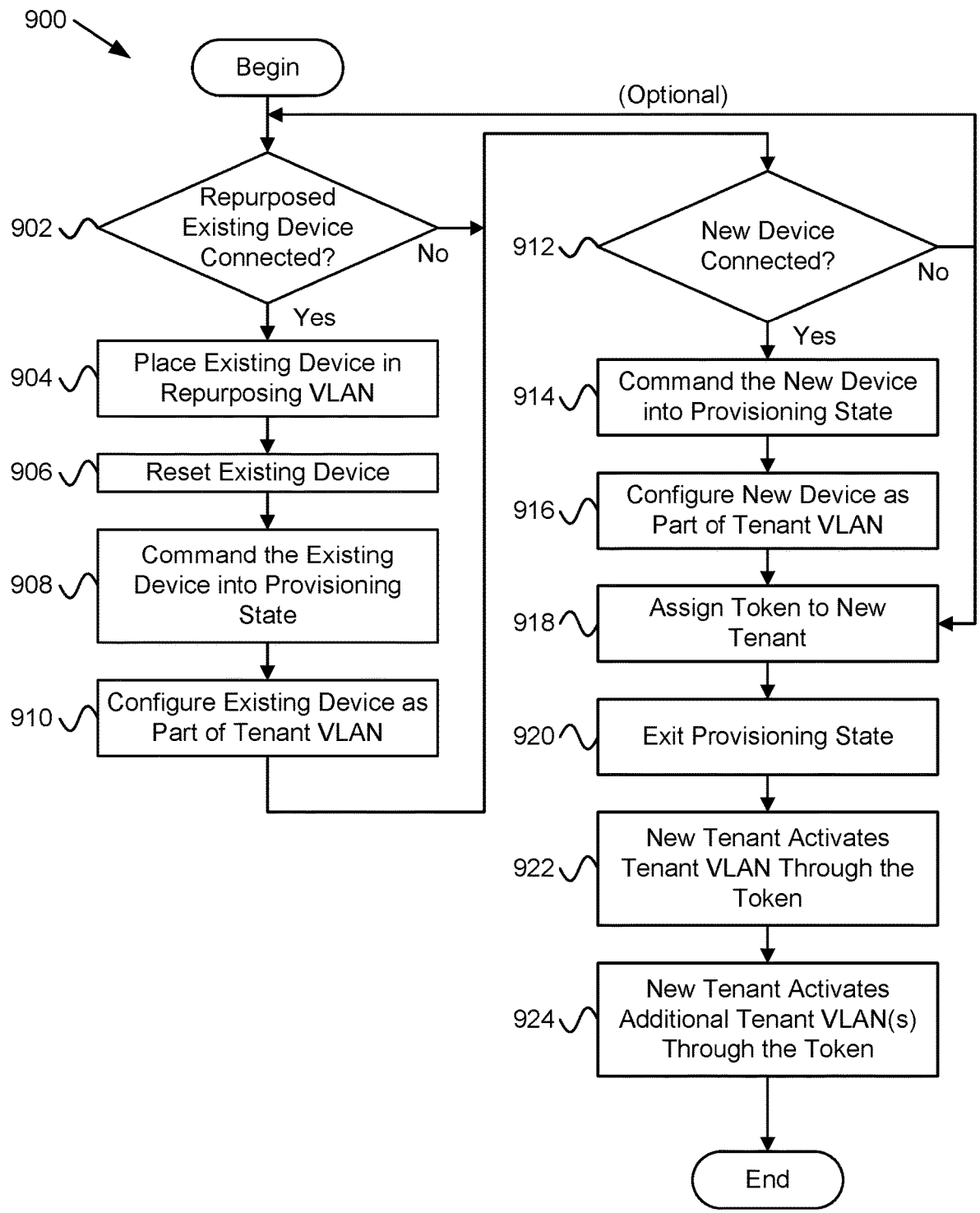
FIG. 9 is a schematic flow chart diagram illustrating another embodiment of a method for securely configuring a tenant VLAN for new devices and existing devices.

FIG. 9 is a schematic flow chart diagram illustrating another embodiment of a method 900 for securely configuring a tenant VLAN for new devices and existing devices. The method 900 begins and determines 902 if an existing device is connected to the computing system 100 that has been repurposed for use by a new tenant. For example, the existing device may be off lease or otherwise unused. If the method 900 determines 902 that an existing device is connected to the computing system 100 that has been repurposed for use by a new tenant, the method 900 places 904 the existing device in a repurposing VLAN. The method 900 resets 906 the existing device to a default state. Devices of tenants of the computing system are inaccessible to the existing device after the existing device is reset. The method 900 commands 908 the existing device to the provisioning VLAN, configures 910 the existing device as part of the tenant VLAN accessible by the new tenant in response to receiving tenant configuration information and determines 912 if a new device is connected to the computing system 100.

If the method 900 determines 902 that an existing device is not connected to the computing system 100 that has been repurposed for use by a new tenant, the method 900 determines 912 if a new device is connected to the computing system 100. If the method 900 determines 912 that a new device is connected to the computing system 100, the method 900 commands 914 the new device to enter a provisioning state and configures 916 the new device as part of a tenant VLAN by the new tenant during a provisioning process in response to receiving tenant configuration information, and assigns 918 a token to the new tenant, where the token enables access to devices within a tenant VLAN of the new tenant.

If the method 900 determines 912 that a new device is not connected to the computing system 100, the method 900 assigns 918 a token to the new tenant unless the method 900 also determined that there were no existing devices connected that were repurposed for use by the new tenant, in which case the method 900 returns to the beginning. The method 900 exits 920 the provisioning state and the method 900 allows the new tenant to activate 922 the tenant VLAN through the assigned token. Optionally, the method 900 allows the new tenant to activate 924 one or more additional tenant VLANs through the assigned token, and the method 900 ends. The method 900, in various embodiments, may be implemented using the new device module 302, the provisioning module 304, the configuration module 402, the token module 404, the new VLAN module 406, the repurposing module 408, and the reset module 410.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
    detect connection of a new device to a computing system, the new device comprising a physical device and designated for use by a new tenant, the new device in a default state prior to configuration for use by the new tenant, the computing system comprising a multi-tenant system;
    place the new device in a provisioning virtual local area network ("VLAN") in response to detecting connection of the new device, the provisioning VLAN comprising a provisioning server; and
    command the new device to enter a provisioning state in response to detecting connection of the new device,
    wherein the new device in the provisioning state is unable to access operational tenant equipment of the computing system and is unable to access data stored by tenants of the computing system.

2. The apparatus of claim 1, wherein the code is further executable by the processor to configure the new device as part of a tenant virtual local area network ("VLAN") accessible by the new tenant during a provisioning process in response to receiving tenant configuration information.

3. The apparatus of claim 2, wherein the code is further executable by the processor to assign a token to the new tenant, wherein the token enables access to devices within a tenant VLAN of the new tenant.

4. The apparatus of claim 3, wherein the code is further executable by the processor to enable an additional tenant VLAN in response to a command by the new tenant, wherein the additional VLAN is configured through a provisioning VLAN during the provisioning process and the token allows the new tenant access to the additional tenant VLAN.

5. The apparatus of claim 4, wherein the token is configured to be accessible by a landlord server to grant and revoke access by the new tenant to one or more of:
the tenant VLAN; and
the additional tenant VLAN.

6. The apparatus of claim 2, wherein the code is further executable by the processor to:
    place an existing device in a repurposing VLAN, the existing device comprising a physical device and connected to the computing system and previously used by a tenant;
    reset the existing device to a default state, wherein devices of tenants of the computing system are inaccessible to the existing device after the existing device is reset;
    move the existing device to the provisioning VLAN; and
    configure the existing device as part of the tenant VLAN accessible by the new tenant in response to receiving tenant configuration information.

7. The apparatus of claim 1, wherein the computing system comprises a plurality of tenants, each tenant accessing one or more VLANs, each VLAN accessible by a tenant is inaccessible by other tenants.

8. The apparatus of claim 1, wherein the new device is accessible by the new tenant through the tenant VLAN of the new tenant in response to configuration through a provisioning server and in response to exiting the provisioning state.

9. The apparatus of claim 1, wherein the new device comprises one of a computing device with a processor, a processing core, a server, a mainframe computer, a switch, a router, a data storage device, and a networking device.

10. The apparatus of claim 1, wherein the tenant VLAN is accessible through a global network address and computing resources accessible through the tenant VLAN are configured using local network addresses.

11. An apparatus comprising:
a processor;
a memory that stores code executable by the processor to:
    place one or more devices connected to a computing system into a provisioning virtual local area network ("VLAN"), the provisioning VLAN comprising a provisioning server;
    command the one or more devices to enter a provisioning state, the one or more devices comprising physical devices, the computing system comprising a multi-tenant system, wherein the one or more devices in the provisioning state are unable to access operational tenant equipment of the computing system and is unable to access data stored by tenants of the computing system;
    configure the one or more devices as part of a tenant virtual local area network ("VLAN") accessible by a new tenant during a provisioning process in response to receiving tenant configuration information; and
    assign a token to the new tenant, wherein the token enables access to the one or more devices within the tenant VLAN of the new tenant.

12. The apparatus of claim 11, wherein the code is further executable by the processor to:
    detect connection of a new device to the computing system, the new device comprising a physical device and designated for use by the new tenant, the new device in a default state prior to configuration for use by the new tenant;
    place the new device into the provisioning VLAN in response to detecting connection of the new device; and
    command the new device to enter a provisioning state in response to detecting connection of the new device, wherein the new device comprises a device of the one or more devices.

13. The apparatus of claim 11, wherein the code is further executable by the processor to:
    place an existing device in a repurposing VLAN, the existing device comprising a physical device and connected to the computing system and previously used by a tenant;
    reset the existing device to a default state, wherein devices of tenants of the computing system are inaccessible to the existing device after the existing device is reset;
    move the existing device to the provisioning VLAN; and
    configure the existing device as part of the tenant VLAN accessible by the new tenant in response to receiving tenant configuration information, wherein the existing device comprises a device of the one or more devices.

14. The apparatus of claim 11, wherein the token is configured to be accessible by a landlord server to grant and revoke access by the new tenant to the one or more devices of the tenant VLAN.

15. A method comprising:
    detecting connection of a new device to a computing system, the new device comprising a physical device and designated for use by a new tenant, the new device in a default state prior to configuration for use by the new tenant, the computing system comprising a multi-tenant system;

placing the new device in a provisioning virtual local area network ("VLAN") in response to detecting connection of the new device, the provisioning VLAN comprising a provisioning server; and commanding the new device to enter a provisioning state in response to detecting connection of the new device, wherein the new device in the provisioning state is unable to access operational tenant equipment of the computing system and is unable to access data stored by tenants of the computing system.

16. The method of claim 15, further comprising configuring the new device as part of a tenant virtual local area network ("VLAN") accessible by the new tenant during a provisioning process in response to receiving configuration through the provisioning VLAN.

17. The method of claim 16, further comprising assigning a token to the new tenant, wherein the token enables access to devices within a tenant VLAN of the new tenant.

18. The method of claim 17, further comprising enabling an additional tenant VLAN in response to a command by the new tenant, wherein the additional VLAN is configured through the provisioning VLAN during the provisioning process and the token allows the new tenant access to the additional tenant VLAN.

19. The method of claim 18, wherein the token is configured to be accessible by a landlord server to grant and revoke access by the new tenant to one or more of:
the tenant VLAN; and
the additional tenant VLAN.

20. The method of claim 16, further comprising:
placing an existing device in a repurposing VLAN, the existing device comprising a physical device and connected to the computing system and previously used by a tenant;
resetting the existing device to a default state, wherein devices of tenants of the computing system are inaccessible to the existing device after the existing device is reset;
moving the existing device to the provisioning VLAN; and
configuring the existing device as part of the tenant VLAN accessible by the new tenant in response to receiving tenant configuration information.

* * * * *